B. F. COOK.
Traction-Wheel.
No 70,804. Patented Nov. 12, 1867.
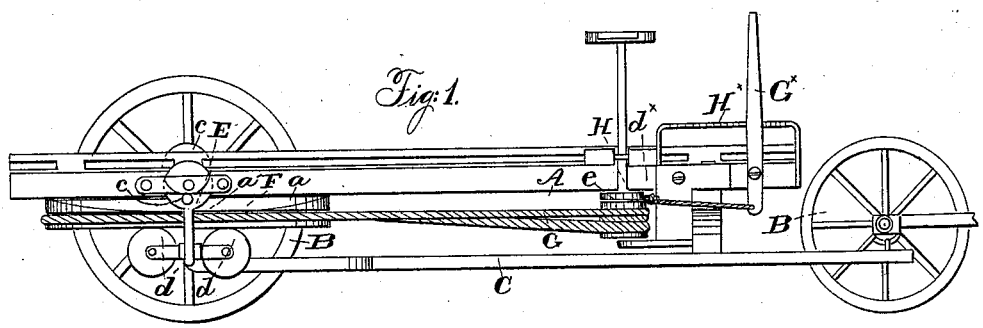
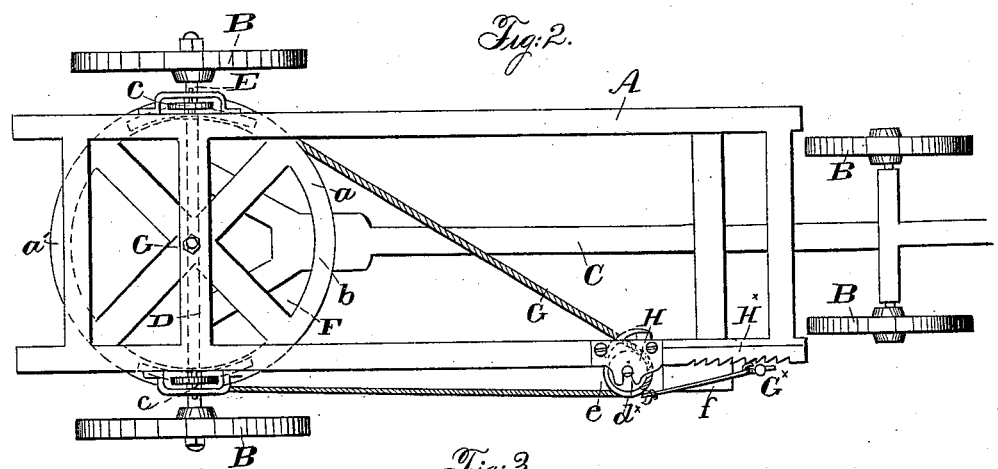
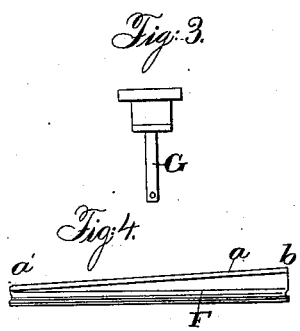
Witnesses
Theo Tusche
Wm Brown
Inventor:
Benj. F. Cook
Per Mumpf
Attorneys

United States Patent Office.

BENJAMIN F. COOK, OF OLEMA, CALIFORNIA.

Letters Patent No. 70,804, dated November 12, 1867.

---

IMPROVEMENT IN LEVELLING ATTACHMENT TO AGRICULTURAL IMPLEMENTS MOUNTED ON WHEELS.

---

The Schedule referred to in these Letters Patent and making part of the same.

---

TO ALL WHOM IT MAY CONCERN:

Be it known that I, BENJAMIN F. COOK, of Olema, in the county of Marin, and State of California, have invented a new and improved Levelling Attachment for Steam Harvesters and other Agricultural Implements which are Mounted on Wheels, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved levelling attachment, to be applied to steam-harvesters, and other agricultural implements which are mounted on wheels, for the purpose of keeping the main frame in a horizontal position in its transverse section when the machine is passing over inclined ground.

The invention consists in interposing between the back axle of the machine and the bolster above it a wheel having its rim bevelled or made inclined, and connected with a windlass or capstan in such a manner that the wheel may be turned with facility, and the main frame of the machine brought to or retained in a horizontal position when the wheels on which the machine is mounted are passing over inclined surfaces. In the accompanying sheet of drawings—

Figure 1 is a side view of my invention.

Figure 2, a plan or top view of the same.

Figure 3, a detached view of a bolt pertaining to the same.

Figure 4, a detached view of a bevelled-rim wheel pertaining to the same.

Similar letters of reference indicate like parts.

A represents a rectangular frame, which is mounted on four wheels, B, the front and rear axles of which are connected by a reach, C, as usual in all four-wheel vehicles. To the rear part of the frame A a bolster, D, is firmly secured, said bolster being directly over the rear axle E; and between the rear axle E and bolster D a wheel, F, is interposed, which works on a king-bolt, G, the latter passing through the bolster, wheel, and rear axle. The wheel F has a horizontal position, and its rim $a$ is bevelled, so as to form two semicircular inclined planes, $a'$ being the lowest and $b$ the highest point of the inclined planes, (see figs. 1, 2, and 4.) The frame A has a friction-roller, $c$, attached to each side of it, and these rollers rest or bear upon the rim $a$ of the wheel F, and the rim of the wheel rests or bears upon rollers, $d$, attached to the rear axle E. These rollers admit of the free turning of the wheel F, which is accomplished by means of a band or belt, $G'$, the latter passing around the wheel, and also around the drum $d^\times$ of a capstan or winch, H, at one side of the frame A, as shown clearly in figs. 1 and 2. The capstan or winch H, and consequently the wheel F, is prevented from casually turning by means of a brake composed of a metal strap, $e$, attached to a lever, $G^\times$, secured to the frame A, and held in any position within the scope of its movement by a rack, $H^\times$. The shaft $e$ is attached at one end to the frame A, and extends around the drum $d^\times$, and has its outer end secured by a cord or chain, $f$, to the lever $G^\times$. By this arrangement it will be seen that the wheel F may be turned either to the right or left, and held in any desired position. The two semicircular inclined planes admit of the frame A being retained in a horizontal position when the device passes over inclined ground; for instance, the right-hand wheels becoming depressed in consequence of passing over lower ground than the left-hand wheels, the driver turns the wheel F so that the right-hand inclined side of the wheel will pass between the friction-rollers $c$ $d$ at the right-hand side of the frame A, thereby retained in a horizontal position. In case the left-hand wheels of the machine become depressed in passing over lower ground than the right-hand ones, the wheel F is adjusted so as to prevent the left-hand side of the frame from becoming depressed.

This invention will prove a great advantage in those machines which are mounted on wheels, and used for agricultural purposes, and which, to insure perfect operation, should have their main frames retained in a horizontal position, such, for instance, as steam-harvesters, steam-ploughs, &c., &c.

Having thus described my invention, I claim as new, and desire to secure by Letters Patent—

The application of a wheel, F, provided with a rim, $a$, bevelled so as to form inclined planes, and interposed between the rear axle and bolster of the machine, substantially as and for the purpose set forth.

I also claim the combination of the wheel F and the capstan or winch H, substantially as and for the purpose specified.

I further claim the brake $e$, arranged in relation with the drum $d^\times$ of the capstan or winch H, and connected to the lever $G^\times$, when said parts are used in combination with the wheel F, for the purpose set forth.

The above specification of my invention signed by me this 1st day of April, 1867.

BENJ. F. COOK.

Witnesses:
A. B. ABBOTT,
E. ALLEN.